(No Model.)  5 Sheets—Sheet 1.

F. A. WISWELL.
CRUSHING MILL.

No. 473,280.  Patented Apr. 19, 1892.

WITNESSES:
Robert A. Hann.
G. S. Wiswell.

INVENTOR
Frederick A. Wiswell.

(No Model.) 5 Sheets—Sheet 3.

F. A. WISWELL.
CRUSHING MILL.

No. 473,280. Patented Apr. 19, 1892.

WITNESSES:
Robert A. Hann.
Y. S. Wiswell.

INVENTOR:
Frederick A. Wiswell.

(No Model.)

F. A. WISWELL.
CRUSHING MILL.

No. 473,280. Patented Apr. 19, 1892.

5 Sheets—Sheet 5.

WITNESSES:
Robert A. Hann.
G. S. Wiswell.

INVENTOR
Frederick A. Wiswell.

UNITED STATES PATENT OFFICE.

FREDERICK A. WISWELL, OF LYNN, MASSACHUSETTS.

CRUSHING-MILL.

SPECIFICATION forming part of Letters Patent No. 473,280, dated April 19, 1892.

Application filed October 26, 1891. Serial No. 409,933. (No model.)

*To all whom it may concern:*

Be it known that I, FREDERICK A. WISWELL, of Lynn, in the county of Essex and State of Massachusetts, have invented new and useful Improvements in Crushing-Mills, which I entitle a "Tri-Cone Crushing-Mill," of which the following, taken in connection with the accompanying drawings, is a specification.

My invention relates to crushing-mills, and has for its object to provide a pulverizing machine simple in construction, the wearing parts cheaply and quickly renewed, the material crushed, if desired, to a high degree of comminution with the minimum of power, and whose portability will permit the various parts to be conveyed with ease through wooded and rough country.

My invention is more particularly designed for pulverizing ores of metals, but may be used for grinding wood pulp for paper-stock or for reducing to a high degree of fineness any substance capable of being so treated.

Figure 1:
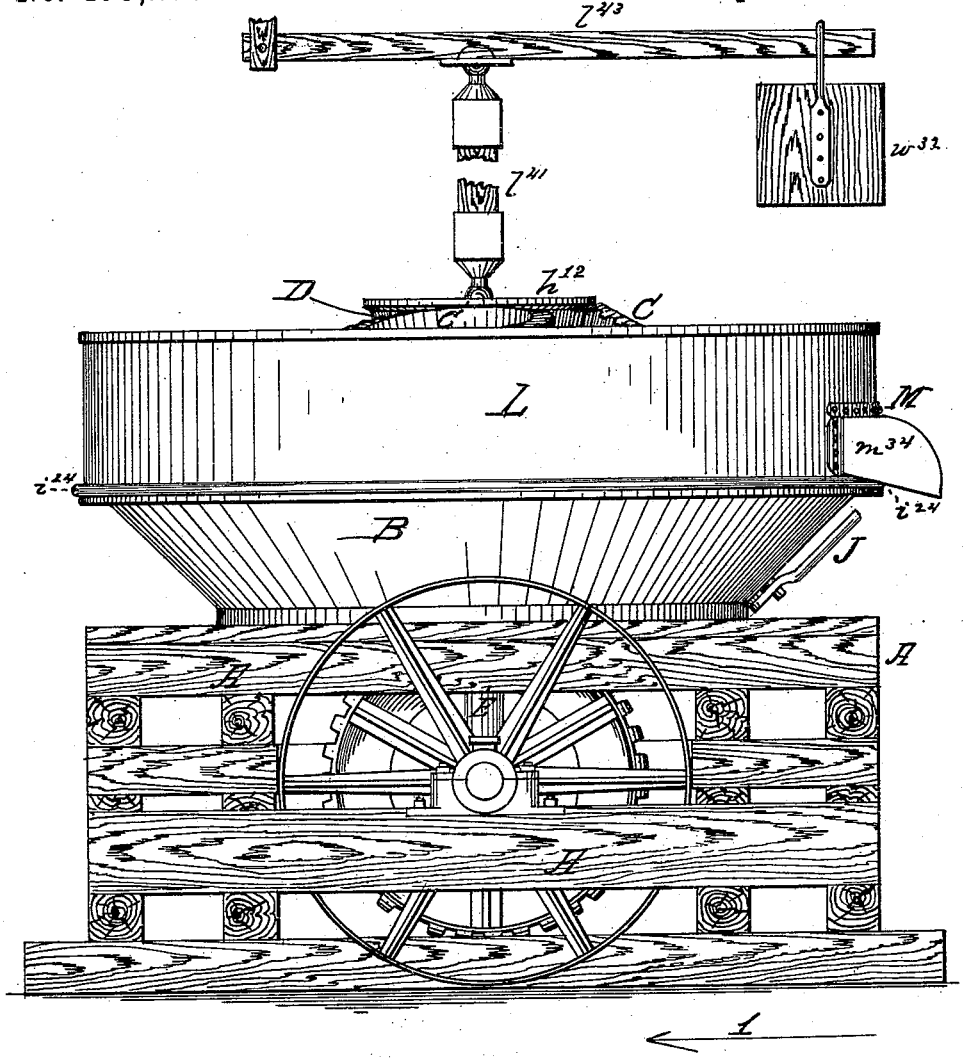
Figure 2:
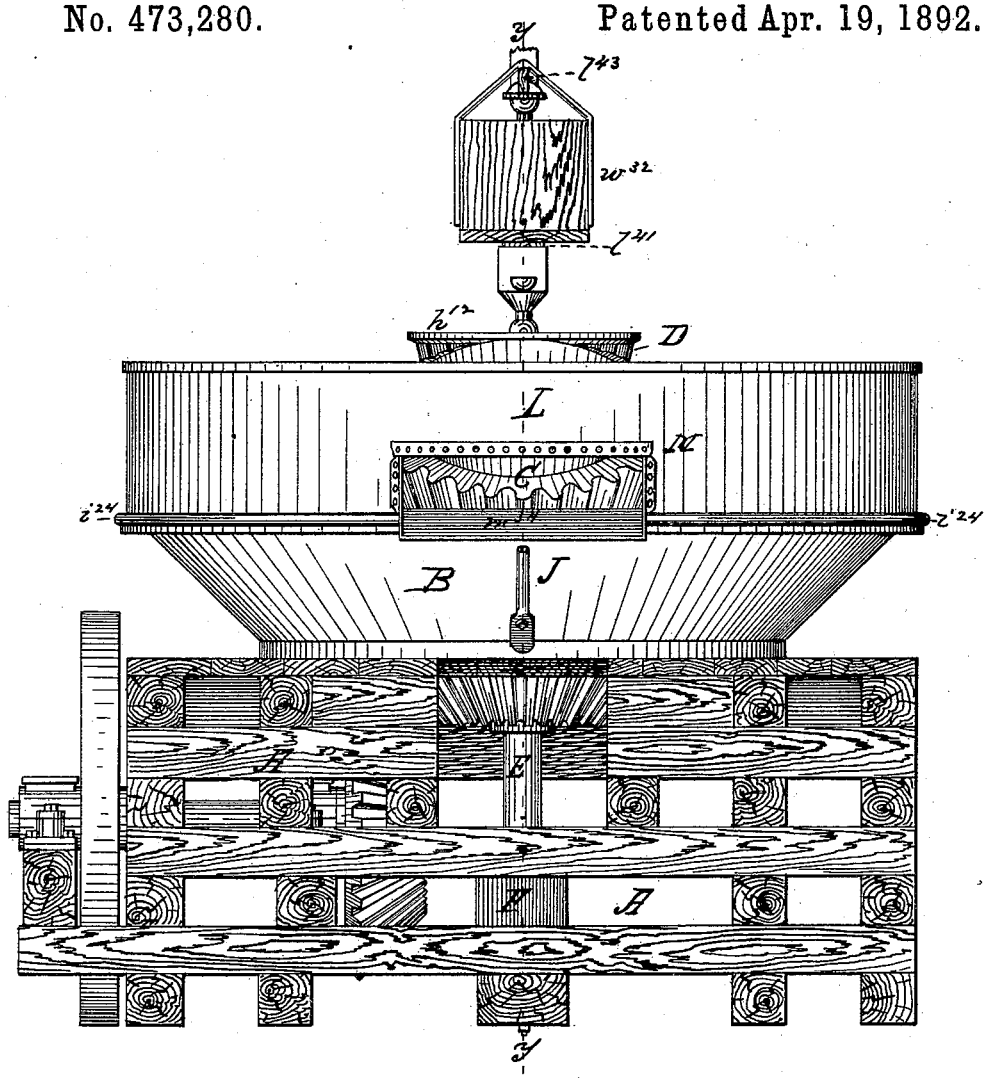
Figure 3:
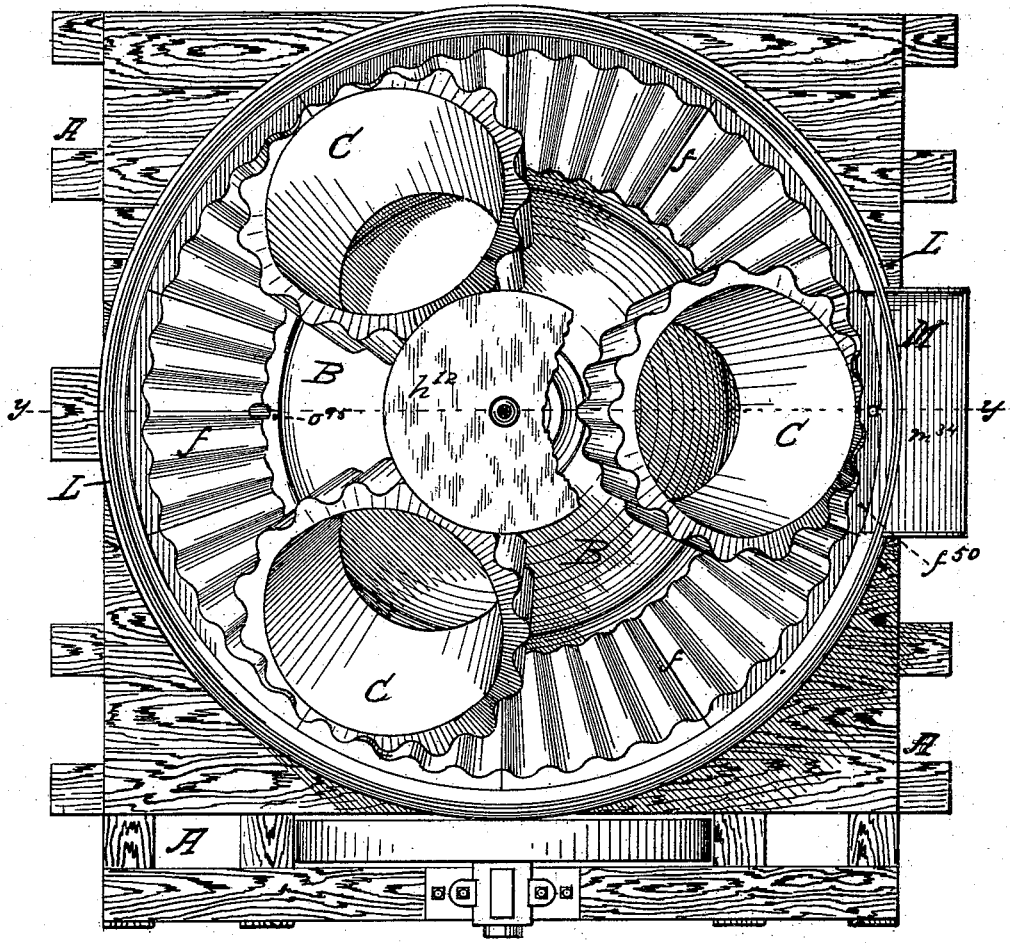
Figure 4:
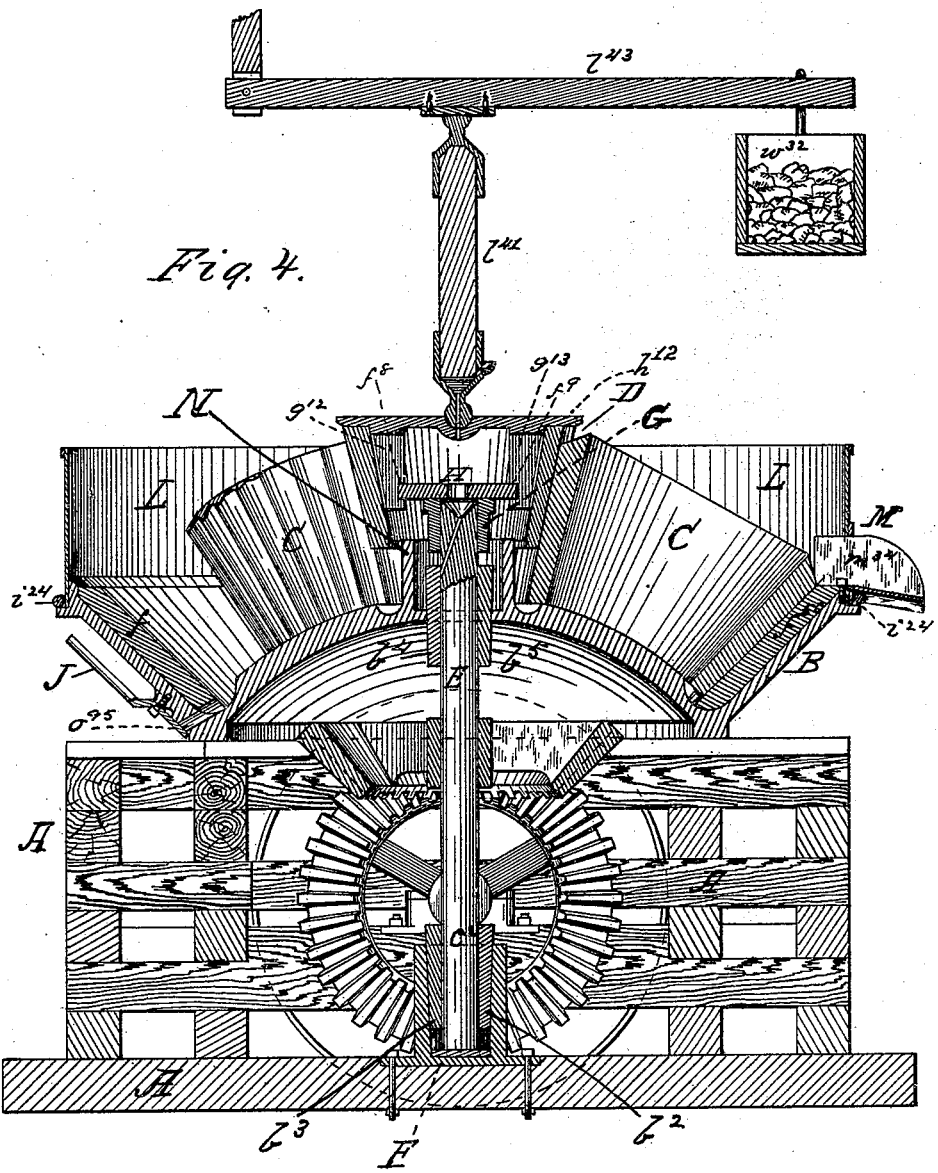

Figure 1, Sheet 1, is a side elevation of a machine embodying my invention. Fig. 2, Sheet 2, is a front elevation of the same looking in the direction of arrow 1, Fig. 1. Fig. 3, Sheet 3, is a plan view of the same, parts being shown as broken away to more fully show the construction. Fig. 4, Sheet 4, is a vertical section of the same, taken on the lines $y\ y$, Figs. 2 and 3; and Figs. 5, 6, 7, 8, 9, 10, 11, 12, 13, 14, and 15, Sheet 5, are detail views of parts to be hereinafter described.

The foundation A may be of any suitable material. Upon this the bowl B of the mill rests. The driving mechanism is also secured to the foundation A. Plates $f$, Figs. 3, 5, and 6, line the interior walls of the bowl B in such a manner that they may be replaced quickly and easily. The plates $f$ are fluted on their concave wearing sides, the flutes being so made as to serve as teeth and at the same time as jaws to retain the material being crushed. The longitudinal lines of all the flutings converge toward a common center $c^2$, coinciding with the center of the vertical shaft E. Corresponding to and fitting therewith are other flutings on the peripheries of the crushing-cones C. These "cones" C, so called, are frustums thereof, and are made hollow in order that their lower ends may always fit the spherically-shaped bottom of the bowl B. The longitudinal lines of the flutings on the cones C also converge toward the common center $c^2$, as do the flutings on the driving-cone D, to which motion is imparted by means of special mechanism automatically adjustable to the vertical shaft E, that is made to revolve by any suitable means.

The vertical shaft E is stepped in the bearing-box F, the upper part being supported by the half-boxes $b^4\ b^5$, Figs. 4, 11, 12, 13, and 14, that are vertically and downwardly tapered on their backs, making in cross-section a rectangular outline. They are supported, prevented from turning, and compressed by their own gravity, fitting into a rectangular hole (see Fig. 15, Sheet 5) made in the center of the bowl B for that purpose. The half-boxes $b^2\ b^3$, Fig. 4, are like in construction and operation.

Figure 7:
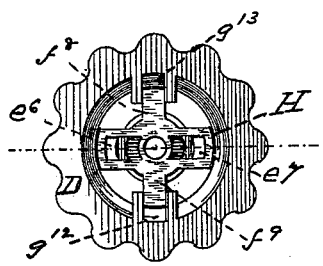
Figure 8:
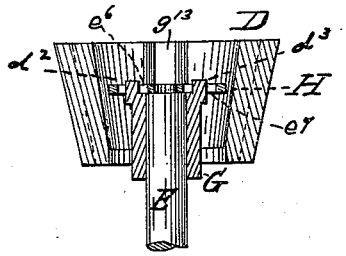
Figure 10:
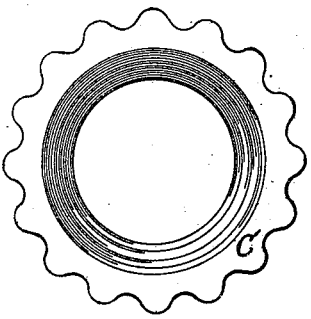
Figure 9:
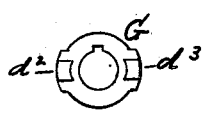
Figures 11, 12, 13, 14:
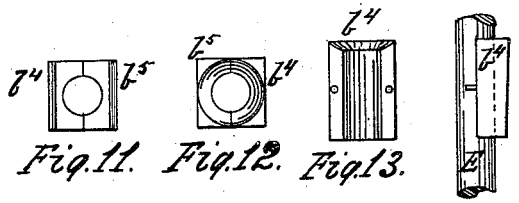
Figure 15:
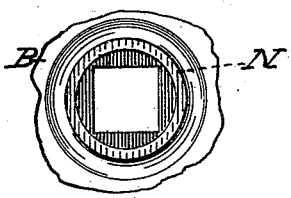

To the upper extremity of the vertical shaft E is firmly secured a capital G, Figs. 4, 8, and 9, on the upper face of which are two projections $d^2\ d^3$, Figs. 4, 7, 8, and 9, that enter and engage with a connecting-plate H, Figs. 4, 7, and 8, provided with two openings $e^6\ e^7$ for that purpose. These openings permit lateral movement therein of the lugs $d^2\ d^3$ in the direction parallel to the said lugs. At a right angle to these openings $e^6\ e^7$ are lateral projections $f^8\ f^9$, integral with the connecting-plate H, and whose outer ends $f^8\ f^9$ partially project into vertical ways $g^{12}\ g^{13}$, formed by ribs projecting from the interior of the driving-cone D, thus permitting of both vertical and horizontal movement of the said driving-cone. This construction provides for wear of the cones D and C and for obstructions—such as drill-points, iron nuts, &c.—which may accidentally enter the mill with the ore, in which case the obstructed cone C will be forced vertically and to one side, lifting and at the same time forcing the cone D to one side without interfering with the rotary motion of any of the moving parts, and materially obviating danger of breakage, while permitting effective work by the unobstructed cones C as the other is passing the obstruction.

The driving-cone D may be provided with a cover or plate $h^{12}$, made to overhang the flutings or teeth of the cones C, which, in case uncrushable obstructions should fall into the mill, will rise against the said plate $h^{12}$ and relieve to that extent the weight on the said cone D. The plate $h^{12}$ can also be made to serve as a step for the pressure-leg $l^{41}$, as shown in Fig. 4, the upper extremity of which serves as a fulcrum for the lever $l^{43}$, which is fitted with a movable weight $w^{32}$, the purpose of which is to vary the pressure of the crushing-cones C to suit the character of material being crushed.

Figure 5:
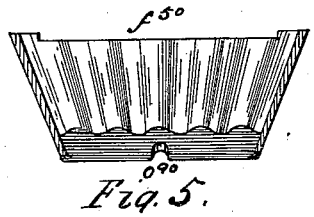
Figure 6:
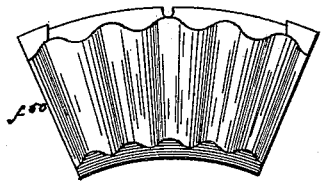

The wearing-plates $f$, when joined and in place, have an exterior annular contour corresponding to the interior annular contour of the bowl B. One of the plates $f^{50}$, Figs. 5 and 6, is depressed at the top, so as not to obstruct the outflow of comminuted pulp. The plate opposite $f^{50}$ is cut away at $o^{90}$, as shown in Fig. 4, or, as shown in Figs. 1 and 2, in any other plate $f$, the two different positions of the said opening being shown to indicate that it may be placed wherever it is most convenient. This opening $o^{90}$ coincides with the tap-off hole $o^{95}$, Fig 4, in the bottom of one side of the bowl B. A gate J is arranged to open or close the tap-off hole $o^{95}$ when desired.

Surrounding the bowl B and tightly secured thereto by the hoop $i^{24}$ is a curb L, having at one side an opening M, provided with a spout $m^{34}$. By damming up the opening M to a height desired the level of the contained material will be correspondingly raised.

In order to prevent overflow of pulp down the center of the mill, an inner curb N is formed by raising an annular ring on the apex of the spherical bottom of the bowl B, thus inclosing the upper bearing of the vertical shaft E to a point above the level of the pulp within the mill.

The opening may be covered by a screen having openings of the size desired, or the pulverized material may be permitted to grade itself by the rapidity of the movement of the running parts of the mill or by the flow of water.

In dry-crushing the whole mill may be covered with a hood and the sufficiently-pulverized material removed by an exhaust-fan or other suitable means.

Having thus generally described my invention, the particular features that I claim as novel are—

1. In a crushing-machine having crushing-cones C fluted on their peripheries, the flutes pointing toward a common center $c^2$ and engaging with the flutes of the driving-cone D and with flutes on the plates $f$, substantially as set forth.

2. In a crushing-machine having fluted crushing-cones C driven by the fluted cone D, that is driven by a self-adjusting coupling H, the combination of the cones C with the corrugated plates $f$, detachably secured within the bowl B, having a convex spherical bottom crowned at its highest point with a curb N, for the purpose substantially as set forth.

3. In a machine for crushing, the fluted cones C, engaging with and pressing against the wearing-plates $f$, the pressure obtained by the driving-cone D, rotated by the self-adjusting coupling H, all operating substantially as and for the purpose set forth.

4. In a crushing-machine, the combination of a bowl B, the crushing-cones C, and a hollow driving-cone D, within which is a self-adjusting coupling H, that permits of vertical and lateral movement of the cone D while driving the crushing-cones C, for the purpose substantially as set forth.

5. In a crushing-machine, the combination of the bowl B, having a convex spherical bottom, the inside of the rim of the said bowl B lined with vertically-corrugated plates $f$, with the corrugations of which engage similar corrugations on the face of the crushing-cones C, that are driven and pressed apart by the driving-cone D, also having on its face corrugations like those on the cones C and plates $f$, the longitudinal lines of all these corrugations converging toward a common center $c^2$, the cap $h^{12}$ of the driving-cone D made so as to receive the lower end of the pressure-leg $l^{41}$, pressure being applied thereto by means of the weighted lever $l^{13}$, substantially as shown, and the driving-cone D made to revolve by the vertical shaft E through the medium of the self-adjusting coupling H, all operating as and for the purpose substantially as hereinbefore set forth.

In testimony whereof I have signed my name to this specification in the presence of two subscribing witnesses.

FREDERICK A. WISWELL.

Witnesses:
C. F. BROWN,
MINNIE WARD JACKSON.